United States Patent
Hunt et al.

(10) Patent No.: US 12,457,932 B2
(45) Date of Patent: Nov. 4, 2025

(54) SENSING ARRAY FOR GRAIN TANK

(71) Applicant: CNH Industrial America LLC, New Holland, PA (US)

(72) Inventors: Cory Douglas Hunt, Millersville, PA (US); Jesse Baird, Lancaster, PA (US); Denver R. Yoder, Manheim, PA (US); Kenneth Seiders, Jr., Elizabethtown, PA (US); Paul Deysher, Reinholds, PA (US)

(73) Assignee: CNH Industrial America LLC, New Holland, PA (US)

( * ) Notice: Subject to any disclaimer, the term of this patent is extended or adjusted under 35 U.S.C. 154(b) by 505 days.

(21) Appl. No.: 17/927,278

(22) PCT Filed: May 27, 2021

(86) PCT No.: PCT/US2021/034552
§ 371 (c)(1),
(2) Date: Nov. 22, 2022

(87) PCT Pub. No.: WO2021/243039
PCT Pub. Date: Dec. 2, 2021

(65) Prior Publication Data
US 2023/0189708 A1 Jun. 22, 2023

Related U.S. Application Data

(60) Provisional application No. 63/031,946, filed on May 29, 2020.

(51) Int. Cl.
*A01D 41/127* (2006.01)
*A01D 41/12* (2006.01)
*G01F 23/292* (2006.01)

(52) U.S. Cl.
CPC ..... *A01D 41/1275* (2013.01); *A01D 41/1208* (2013.01); *G01F 23/292* (2013.01)

(58) Field of Classification Search
CPC .. A01D 41/1208; A01D 41/1275; B65B 1/30; B65B 1/48; G01F 22/00; G01F 23/2921
See application file for complete search history.

(56) References Cited

U.S. PATENT DOCUMENTS 4,193,004 A * 3/1980 Lobdell ............... G01F 23/2925
250/577
4,904,878 A * 2/1990 Gipp ................... G01F 23/2921
250/577

(Continued)

FOREIGN PATENT DOCUMENTS

DE 102005054203 A1 5/2007
DE 102014106736 A1 * 11/2015 ............. G01F 23/24

(Continued)

OTHER PUBLICATIONS

International Search Report and Written Opinion for PCT Application No. PCT/US2021/034552 dated Sep. 9, 2021 (46 pages).

*Primary Examiner* — Joseph M Rocca
(74) *Attorney, Agent, or Firm* — Buchanan Ingersoll & Rooney PC

(57) ABSTRACT

A combine harvester includes (i) a grain tank for storing separated grain and having a bottom end and a top end, and (ii) a grain tank level sensor array for detecting a level of grain in the grain tank. The grain tank level sensor array includes a plurality of sensors, wherein the grain tank level sensor array extends between the bottom end and the top end of the grain tank. The sensors are spaced apart between the bottom end and the top end. A spacing between adjacent sensors decreases in a direction towards the top end of the grain tank.

12 Claims, 8 Drawing Sheets

(56) References Cited

U.S. PATENT DOCUMENTS

| | | | |
|---|---|---|---|
| 5,325,716 A | 7/1994 | Häfner et al. | |
| 5,529,537 A * | 6/1996 | Johnson | A01D 41/1275 |
| | | | 460/150 |
| 8,749,628 B2 * | 6/2014 | Wuestefeld | G01F 1/00 |
| | | | 198/810.01 |
| 8,933,789 B1 * | 1/2015 | Fink | G06K 19/0716 |
| | | | 342/124 |
| 9,085,381 B2 | 7/2015 | Gengerke | |
| 10,041,960 B2 * | 8/2018 | MacIntyre | A61B 5/14546 |
| 10,231,381 B2 | 3/2019 | Holt, II et al. | |
| 10,701,861 B2 * | 7/2020 | Gould | A01D 41/1275 |
| 11,533,845 B2 * | 12/2022 | Koch | G06Q 50/02 |
| 11,793,112 B2 * | 10/2023 | Hunt | G01F 23/804 |
| 2011/0213531 A1 * | 9/2011 | Farley | A01D 41/1275 |
| | | | 701/50 |
| 2015/0259083 A1 * | 9/2015 | Gengerke | B65B 1/48 |
| | | | 340/870.02 |
| 2015/0259084 A1 * | 9/2015 | Gengerke | G01F 23/802 |
| | | | 340/870.02 |
| 2016/0011100 A1 * | 1/2016 | Cipullo | G01N 21/8507 |
| | | | 356/436 |
| 2020/0022305 A1 | 1/2020 | Gould et al. | |

FOREIGN PATENT DOCUMENTS

| | | |
|---|---|---|
| EP | 3699559 A1 | 8/2020 |
| JP | H10-75648 A | 3/1998 |
| JP | 2004275040 A | 10/2004 |
| JP | 2009044995 A | 3/2009 |
| JP | 2018050512 A | 4/2018 |
| JP | 2019129719 A | 8/2019 |
| WO | 2015133585 A1 | 9/2015 |

* cited by examiner

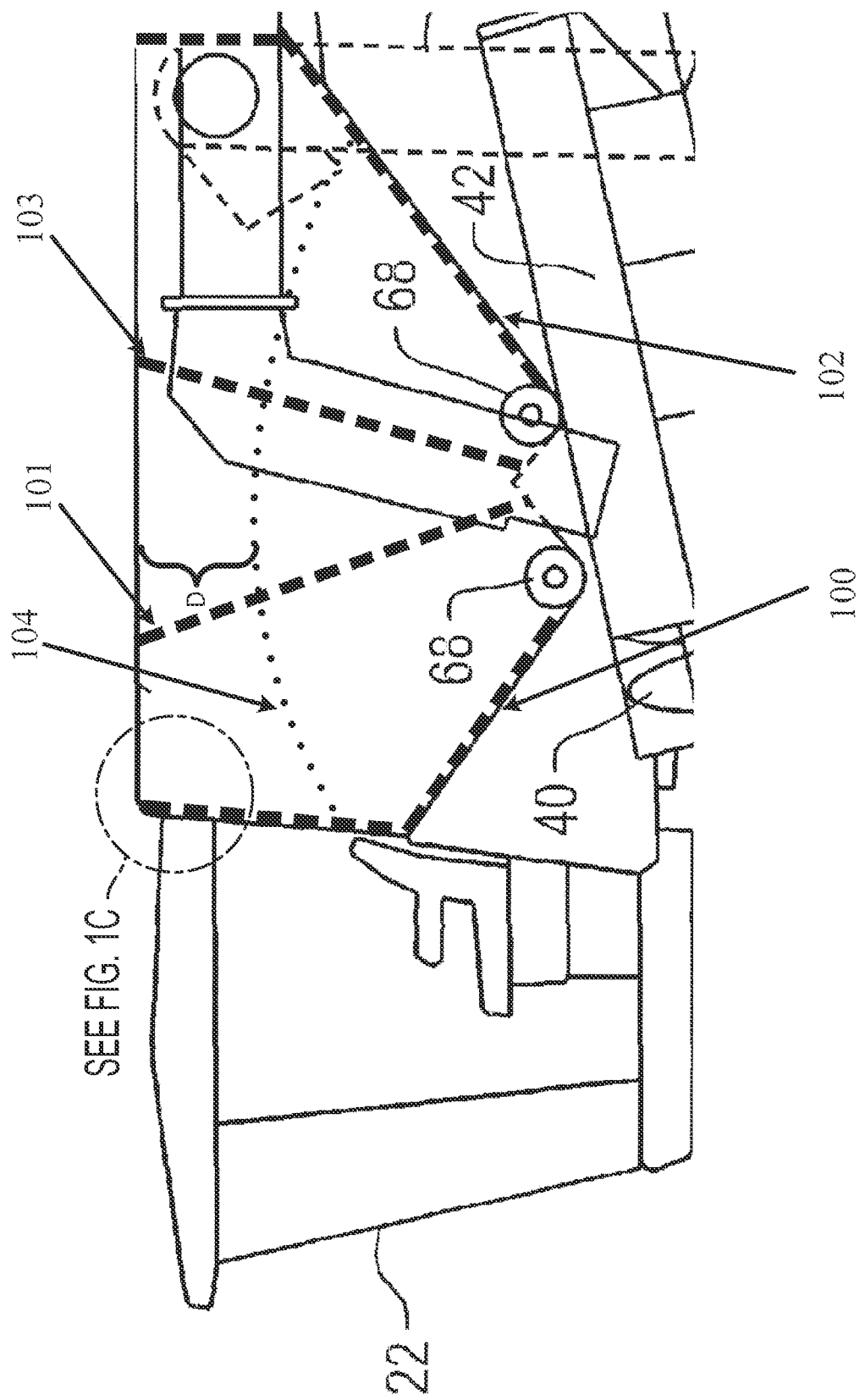

SENSING ARRAY FOR GRAIN TANK

FIELD

The disclosure relates to grain tank measurement systems.

BACKGROUND

Harvesters (e.g. combines) are used to harvest crops. Operations performed by conventional combines include chopping the crop and collecting grain in a grain tank. These conventional combines utilize grain quantity measurement devices. Improvements in such devices are continually sought in the interests of, for example, avoiding spillage of the grain.

SUMMARY

A combine harvester includes (i) a grain tank for storing separated grain and having a bottom end and a top end, and (ii) a grain tank level sensor array for detecting a level of grain in the grain tank. The grain tank level sensor array includes a plurality of sensors, wherein the grain tank level sensor array extends between the bottom end and the top end of the grain tank. The sensors are spaced apart between the bottom end and the top end. A spacing between adjacent sensors decreases in a direction towards the top end of the grain tank.

BRIEF DESCRIPTION OF THE FIGURES

FIG. 1B is a close-up view of the grain tank level sensors on a combine, according to an embodiment of the disclosure.

DETAILED DESCRIPTION

Aspects of the disclosure provide methods and systems for operator adjustable tank level measurement for implementation in a harvester combine.

The terms "grain," "straw," and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, material other than grain (MOG).

Figure 1A:
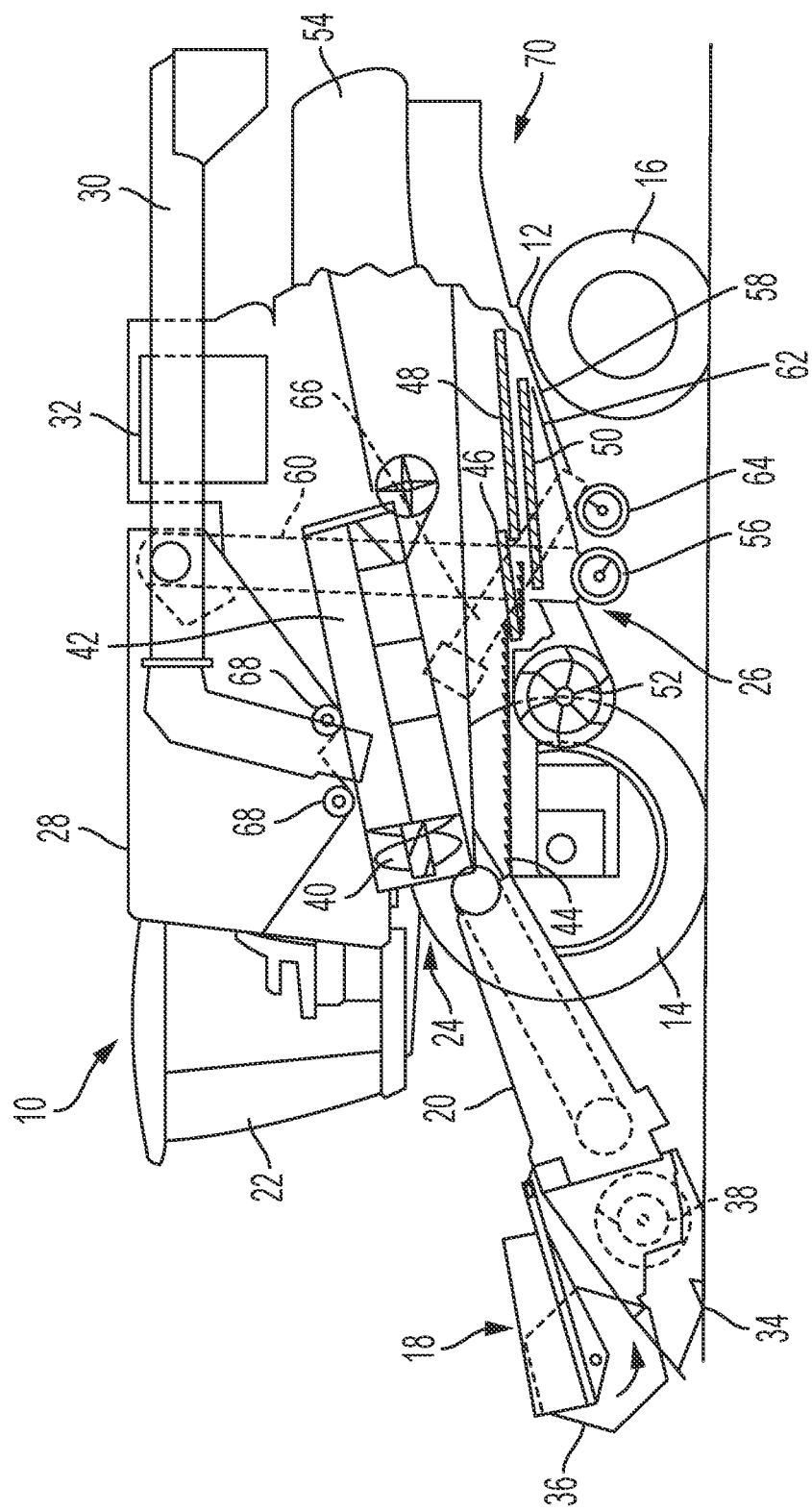
FIG. 1A is a side view of a combine, according to an embodiment of the disclosure.

As is described in U.S. Patent App. Pub. No. 20200022305, which is incorporated by reference herein in its entirety and for all purposes, FIG. 1A depicts one embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged grain elevator 60 for transport to grain tank 28. Tailings from cleaning system 26 fall to a tailings auger trough 64. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 includes a chopper, counter knives, a windrow door and a residue spreader. When combine 10 operating in the chopping and spreading mode, the chopper is set to a relatively high speed (e.g. 3,000 RPM), the counter knives may be engaged, the windrow door is closed and the residue spreader is running (e.g. rotating).

A controller (412 in FIG. 4) measures the collected grain to determine if the grain tank 28 is full. The controller measures the grain with the aid of grain level sensors located within grain tank 28. In one example, shown in FIG. 1B, a first grain tank level sensor array 100 and a second grain tank level sensor array 102 are located along the interior walls of grain tank 28. A third grain tank level sensor array 101 and a fourth grain tank level sensor array 103 (e.g. center arrays) are located in the center of grain tank 28 and extend from the base of the grain tank away from the tank walls towards the center of the grain tank. Grain tank level sensor arrays 100, 101, 102 and 103 may include an array of acoustic sensors, pressure sensors, optical sensors, and/or the like that detect the presence of grain in the tank in a local region surrounding the sensor.

Grain tank level sensor arrays 100-103 in FIG. 1B extend from a bottom end or portion of the grain tank to a top end or portion of the tank. Grain tank level sensor arrays 100-103 may include optical sensors such as infrared (IR) sensors that transmit an IR beam of light. If grain fills the tank and covers an IR sensor, the IR light reflects back to the IR receiver, thereby triggering the sensor. Alternatively, the individual sensors 150 (FIG. 1C) may be diaphragm sensors or pressure transducers, for example. Those skilled in the art will recognize that various sensors can be used to sense the level of grain within tank 28.

A controller receives a trigger signal from the sensor and determines the level of grain in the tank based on the known location of the sensor within the tank. For example, when grain pile 104 is present in the tank, the 1st-9th sensors in arrays 100 and 102 trigger, and the 1st-8th sensors in arrays 101 and 103 trigger. Each sensor is schematically represented by a dash mark in FIG. 1B. The triggered sensors correspond to a predetermined level (e.g. 75%) of grain within the tank. In this example, when the grain triggers the sensors, the controller determines that the grain heap surface is located at the location of the 9th sensor. Notifications such as a display of the tank level, tank volume, or a trigger of an alarm are output to the operator.

The shape of the grain pile within the tank depends on various factors including the slope of the ground that the combine is traveling on. Having multiple arrays of sensors at multiple locations within the tank provides a system that is able to more accurately detect grain level when the grain pile is not uniform. For example, as shown in FIG. 1B, on level ground, the detected levels between arrays are generally similar (e.g. sensors 100 and 102 both show 75% full) due to a uniform grain pile in the tank. However, when the combine is harvesting on a slope or a hill, and leaning forward, backward, to the left, or to the right, the levels detected by sensor arrays 100 and 102 may not coincide due to the slope of a non-uniform grain pile in the tank (e.g. if the combine is harvesting downhill, sensors in sensor array 100 may detect 75% and sensors in sensor array 102 may detect only 50%). This discrepancy is important to detect, because the side of the tank with the highest grain level is more likely to overflow and spill out of the top of the grain tank. Such spillage results in lost revenue.

Figure 1C:
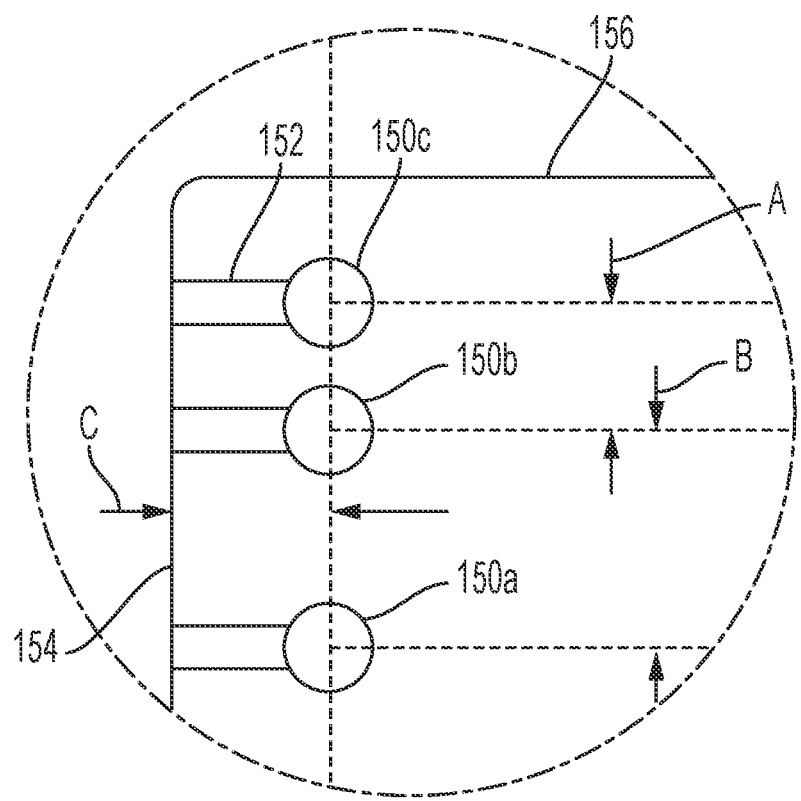
FIG. 1C is a detailed view of the level sensor arrangement of FIG. 1B, according to an embodiment of the disclosure.

FIG. 1C is a detailed view of the top end of the sensor array 100. The array 100 includes sensors 150*a*-150*c* (in addition to other sensors located beneath sensor 150*a*). Each sensor 150*a*-150*c* (referred to collectively or individually as sensor(s) 150) is mounted on the side wall 154 of the tank 28 by a spacer 152. It is noted that the side wall 154 (optionally) extends obliquely with respect to a vertical axis or plane. Sensor 150 are spaced from side wall 154 by a predetermined uniform distance 'C.' Alternatively, sensors 150 may be spaced from side wall 154 by different distances. The offset between the side wall 154 and the sensors 150 reduces the amount that crop flow is slowed and/or diverted by the sensing arrays in regions that are already highly susceptible to flow restriction, e.g. nearby the interior walls. Spacer 152 may be a fastener, screw, rod, standoff or sleeve, for example. The surfaces of the spacer 152 are preferably rounded to limit the amount of crop that can accumulate thereupon.

The vertical distance between adjacent sensors 150 decreases as viewed in a direction towards toward the top end 156 of the tank 28. As shown in FIG. 1C, the distance between sensors 150*a* and 150*b* is represented by dimension 'B', and the distance between sensors 150*b* and 150*c* is represented by dimension 'A.' It can be appreciated that distance B is greater than distance A, and that distance A is located closer to top end 156 than distance B. The significance of this arrangement is that the sensors 150 are clustered closer together towards the top end 156 of the tank 28. Because spillage occurs at the top end 156 of the tank, rather than at the bottom end of the tank, the sensors 150 are clustered at the top end of the tank 28. Accordingly, as the grain approaches the top end 156 of the tank 28, the sensors 150 send signals to a controller 412 (as will be described below), and the controller correspondingly warns the operator of the combine harvester that a spillage may occur.

The spacing between adjacent sensors 150 may have two pitch values, i.e., one larger pitch for the lower region of the tank 28, and one smaller pitch for the higher region of the tank. Alternatively, the pitch of the sensors 150 could gradually and uniformly reduce from a larger spacing at the lower region of the tank to a smaller spacing at the higher region of the tank (e.g, 18 inches followed by 16 inches followed by 14 inches, etc.).

It is noted that the details regarding the sensors 150 shown in FIG. 1C can apply to any of the arrays shown herein. The array of sensors 150 may zig-zag or may be oriented obliquely, for example. Although not shown, the sensors 150 may also be positioned on extensions or covers what are mounted on the top side of the grain tank 28.

Figure 2A:
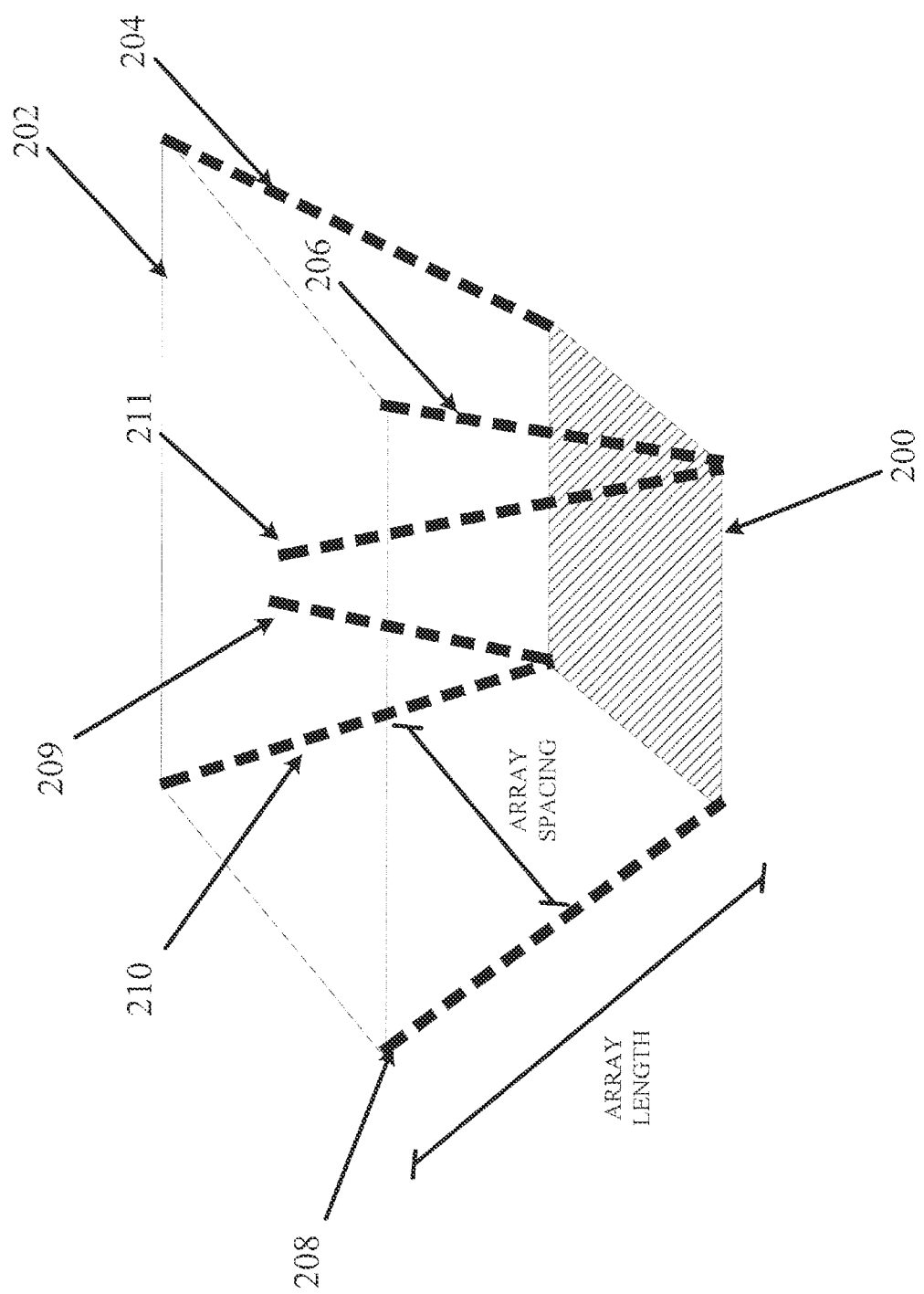
FIG. 2A is a perspective view of the grain tank of the combine, according to an embodiment of the disclosure.

Referring now to FIG. 2A, in order to more accurately measure grain tank level, and avoid spillage, the combine also includes multiple arrays (e.g. 3 or more) of sensors at various locations within the grain tank (e.g., one center array in the middle of the tank and two side arrays along the tank wall). FIG. 2A shows a 3-dimensional view of an example of such a grain tank configuration. Specifically, the grain tank in this example has a 3-dimensional trapezoid-like shape extending from base 200 to top rim 202. The grain tank includes four side arrays of level sensors 204, 206, 208 and 210 positioned in the corners of the tank separated by an array spacing and extending along an array length from base 200 to top rim 202. These sensor arrays are similar to the sensor arrays 100 and 102 shown in FIG. 1B. The grain tank also includes two center arrays of level sensors 209 and 211 positioned extending along an array length from base 200 at an angle towards the center of top rim 202. These sensor arrays are similar to the sensor arrays 101 and 103 shown in FIG. 1B.

The six sensor arrays in FIG. 2A provide the ability to detect six grain level points at six different locations within the tank. In this example, these arrays each have 12 sensors, which provide each array with a resolution of 12 detectable grain levels. In general, the accuracy of the system increases as the number of arrays and number of sensors within each array are increased. Thus, the number of arrays, the number of sensors within each array, and the locations of the arrays within the tank are configurable to achieve the desired accuracy.

Figure 2B:
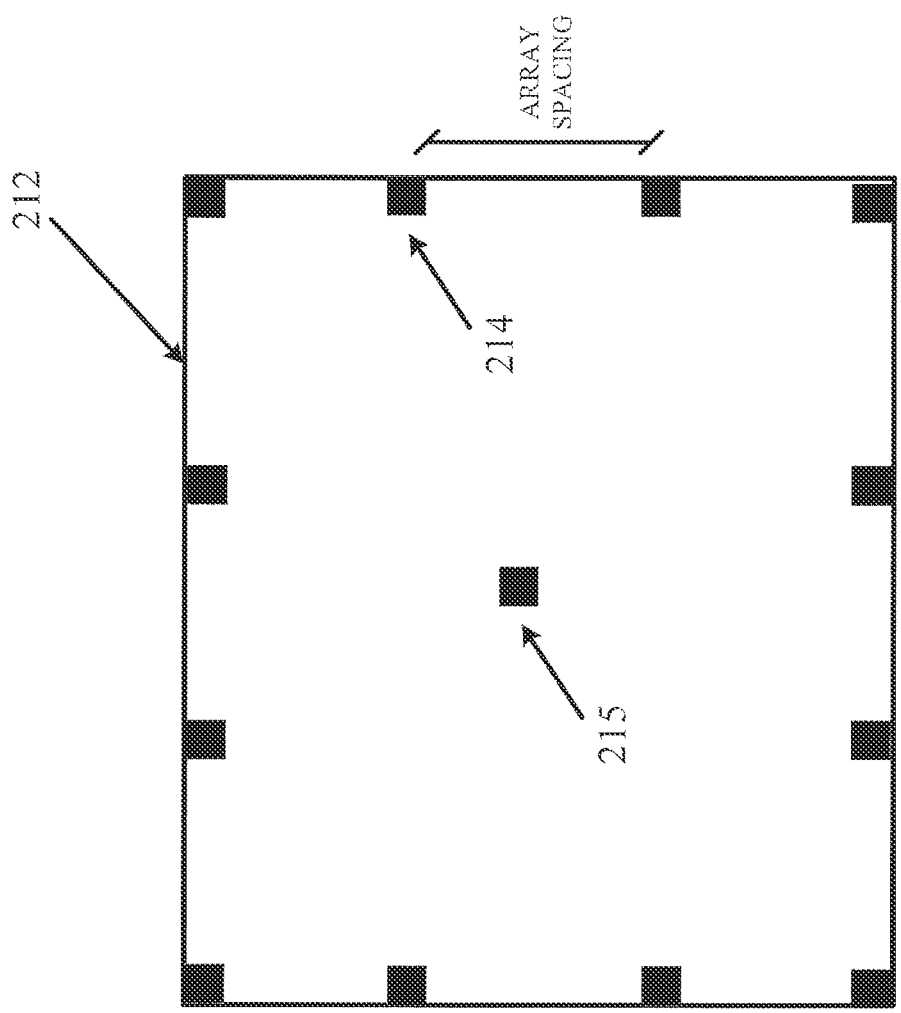
FIG. 2B is a top view of the grain tank of the combine, according to an embodiment of the disclosure.

For example, FIG. 2B shows a top view of tank 212 (i.e., looking down on the top of the tank) that includes 12 side sensor arrays 214 positioned from each other by a set array spacing around the inner wall of the tank and one center sensor array 215 positioned in the center of the tank. This configuration provides 13 data points of grain tank levels around the entire perimeter and the center of the tank. Assuming each array includes 10 sensors, each array would be able to detect the tank fill level at 10 discrete levels. As was described above, the spacing of the arrays may be equidistant, or may follow other spacing patterns. In addition, the sensor arrays can extend along a partial height of the grain tank, and may not necessarily be vertical (i.e., they could be diagonal) or may not be directly in the center of the tank. In some examples, the arrays may be curved (e.g. curved to follow the tank geometry), and segmented (e.g. positioned in portions of the tank). In general, any mathematically describable array configuration can be used to detect the grain.

Figure 3A:
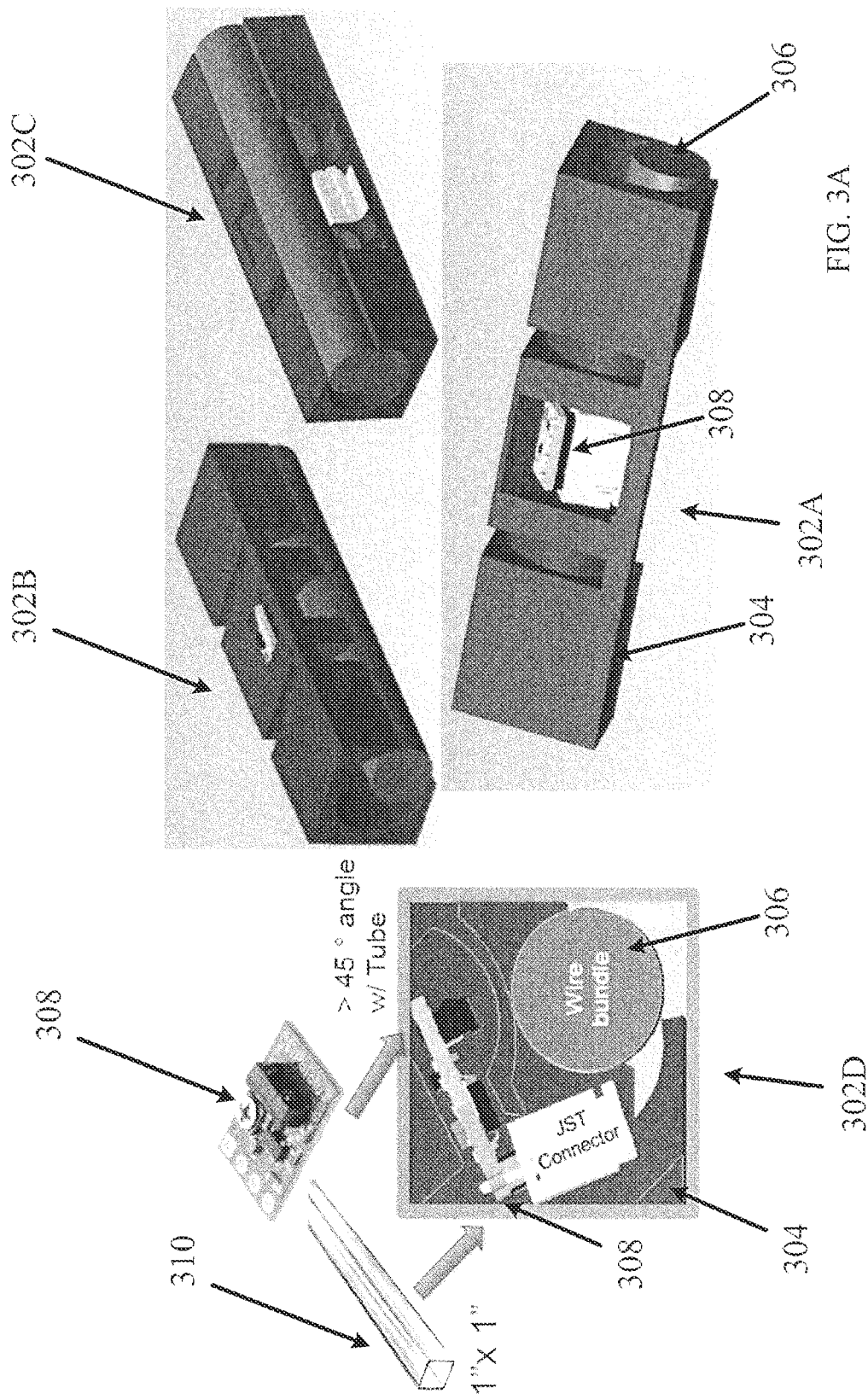
FIG. 3A shows multiple views of the grain tank level sensors, according to an embodiment of the disclosure.

FIG. 3A shows multiple views of optical IR grain tank sensors used within the arrays. Each sensor includes a housing 304 (e.g., plastic), an electrical circuit 308 for driving the sensor components and communicating with the controller, and a channel that allows a wire bundle 306 to pass through. Views 302A, 302B and 302C show various perspective views of the same sensor, while view 302D shows a side view of the sensor. An isolated view of electronic circuit 308 is also shown. In one example, electronic circuit 308 may include an IR transmitter, an IR receiver, and a driver circuit that drives the IR transmitter as well as transmit/receive information to/from a controller (not shown). In this example, the sensors within the array may also be housed in a cube-like sleeve 310 made from transparent material (e.g., clear plastic) which aligns the sensors in a package that is easily mountable within the grain tank, as well as protects the sensors from damage due to the grain and other external factors. In other examples, other types of sensors may be used in place of or in combination with the IR sensors. These other sensors include but are not limited to acoustic sensors, laser sensors, radio frequency sensors and pressure sensors.

Figure 3B:
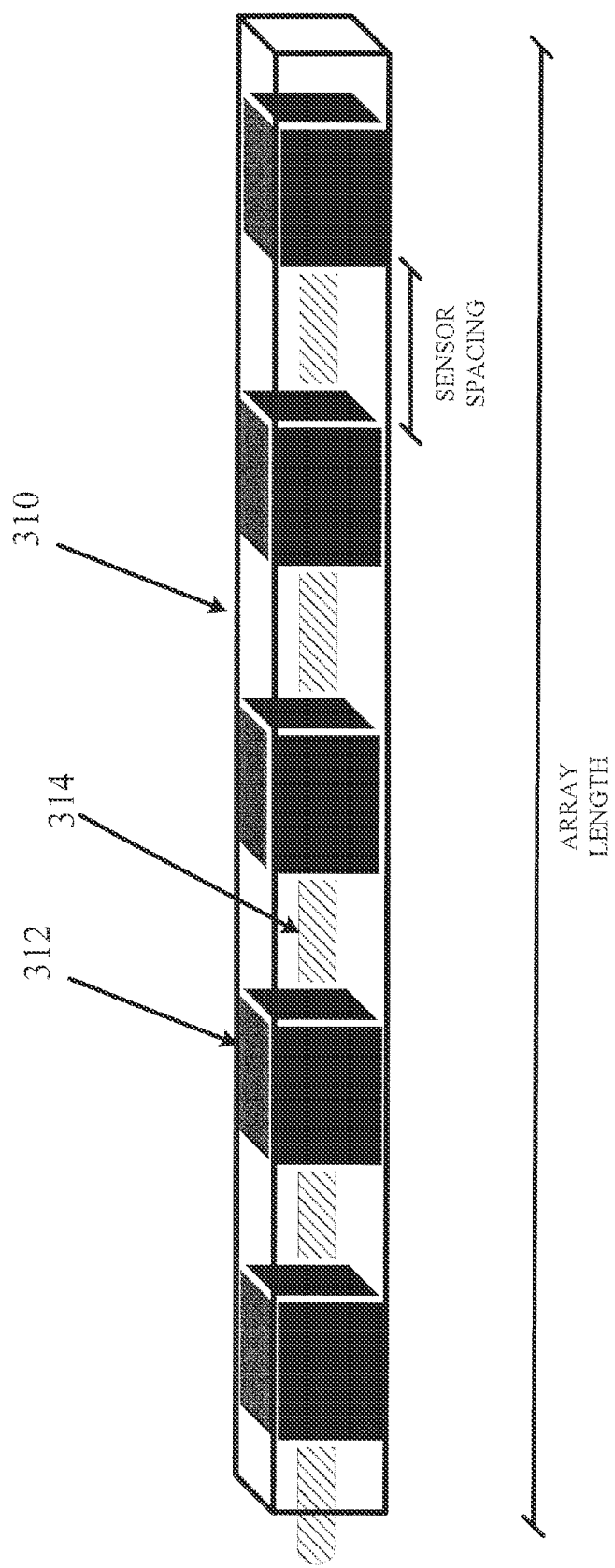
FIG. 3B is a perspective view of the sensor array, according to an embodiment of the disclosure.

An example of the sensor array within cube-like sleeve 310 is shown in FIG. 3B. In this example, the sensor array includes 5 sensors 312 spaced equidistant throughout the array length of sleeve 310. Sensors 312 electrically connect to the controller via wire bundle 314 that runs within cube-like sleeve 310. Although only 5 sensors are shown, it is noted that more than 5 sensors may be utilized. It is also noted that the sensors could be spaced apart in at different sensor spacing intervals that do not have to be equidistant. In addition, although not shown, the end of the wire bundle shown on the left of the figure connects to the combine controller.

Figure 4:
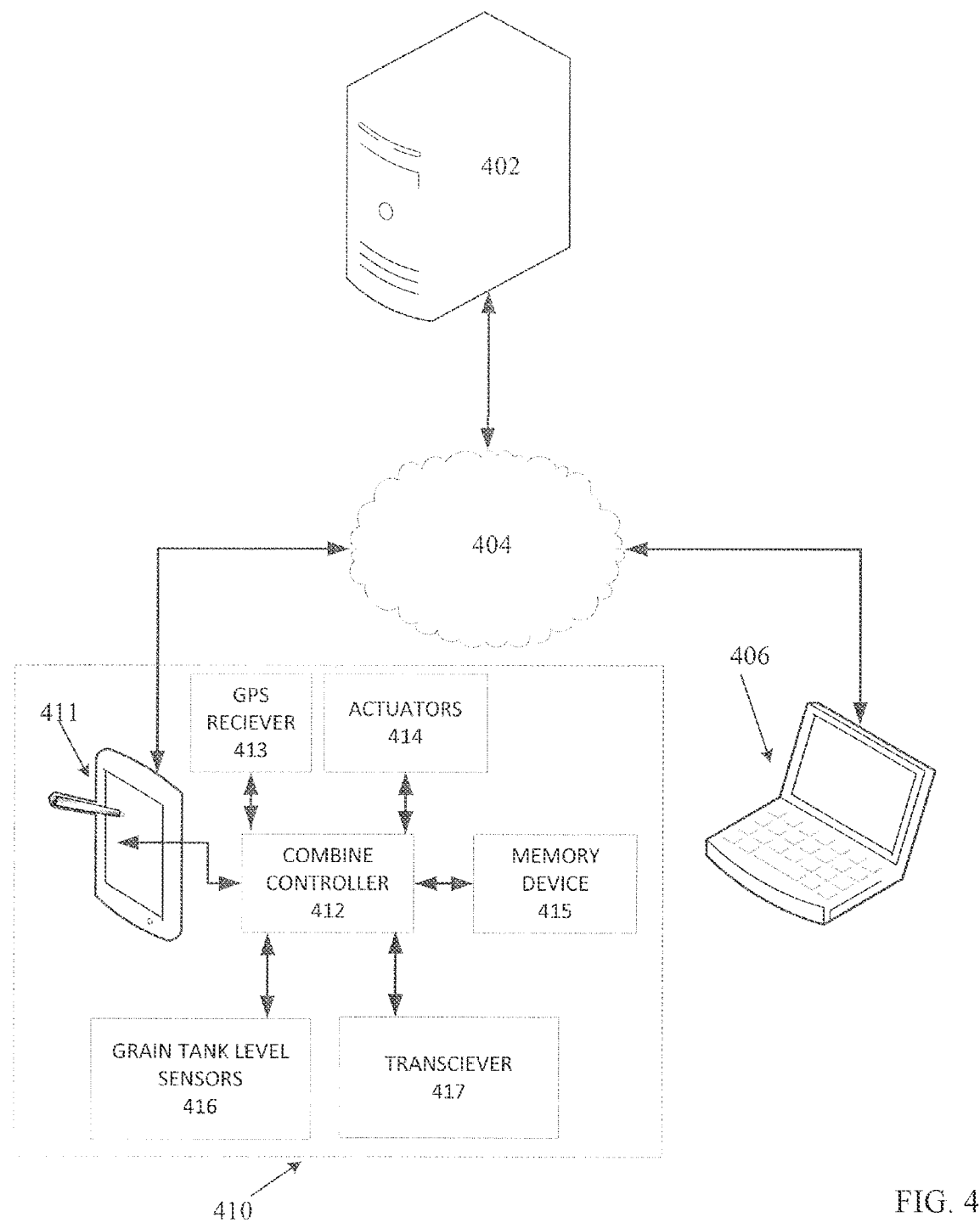
FIG. 4 is a view of the communication between the combine control system and an external network, according to an embodiment of the disclosure.

FIG. 4 shows an example of a system 400 for controlling the combine. The system 400 includes an interconnection between a control system 410 of combine 10, a remote PC 406 and a remote server 402 through network 404 (e.g. Internet). It should be noted that combine 10 does not have to be connected to other devices through a network. The controller of combine 10 can be a standalone system that receives operating instructions (e.g. tank level instructions such as alert levels) through a user interface, through a removable memory device (e.g. Flash Drive) or from a server 402 via transceiver 417 (e.g. Wi-Fi, Bluetooth, Cellular, etc.).

Prior to operating combine 10, an operator may designate the tank level alerts and other tank level related instructions. In one example, the operator uses interface 411 of the combine control system or PC 406 located at a remote location. Interface 411 and PC 406 allow the operator to view locally stored parameters from memory device 415 and/or download parameters from server 402 through network 404. The operator may select (via Interface 411 or PC 406) appropriate tank level related instructions based on various factors including, among others, the type of crop to be harvested by the combine, and the terrain. Once the tank level related instructions are selected, the operator can begin harvesting. Combine controller 412 then controls actuators 414 (e.g. thresher, chopper, etc.) based on the instructions. For example, sensors 416 (e.g. tank level sensor) may be used during harvesting to more accurately determine the grain level to avoid spillage. The sensors 416 can comprise any of the foregoing sensors described with reference to FIGS. 1A-3B. GPS receiver 413 produces information to track harvesting and monitor terrain.

The term "software code" or "code" used herein refers to any instructions or set of instructions that influence the operation of a computer or controller 412. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

What is claimed:

1. A combine harvester comprising:
    a grain tank for storing separated grain, the grain tank having a bottom end, a top end, and a side wall extending between the bottom and top ends, wherein a vertical central axis passes through the tank, and wherein the top end of the side wall is positioned closer to the vertical central axis than the bottom end, and
    a grain tank level sensor array for detecting a level of grain in the grain tank, the grain tank level sensor array comprising a plurality of sensors, wherein the grain tank level sensor array extends between the bottom end and the top end of the grain tank,
    wherein the sensors are mounted to the side wall and are spaced apart between the bottom end and the top end, wherein a spacing between adjacent sensors of the plurality of sensors mounted to the side wall decreases in a direction towards the top end of the grain tank.

2. The combine harvester of claim 1, wherein the side wall is planar.

3. The combine harvester of claim 1, wherein the spacing between a first group of adjacent sensors towards the top end of the grain tank is a first pre-determined value, and the spacing between a second group of adjacent sensors towards the bottom end of the grain tank is a second pre-determined value, and wherein the first pre-determined value is lower than the second pre-determined value.

4. The combine harvester of claim 1, wherein one sensor of the plurality of sensors is positioned at or near the bottom end of the tank, and another sensor of the plurality of sensors is positioned at or near the top end of the tank.

5. The combine harvester of claim 1, further comprising a controller that controls the combine harvester, the controller configured to: receive the level of grain from the grain tank level sensors, and determine a volume of a grain base from the level of the grain.

6. The combine harvester of claim 1, wherein the sensors of the grain tank level sensor array are arranged along a straight line path.

7. The combine harvester of claim 1, wherein the grain tank level sensor array does not follow a straight line vertical path.

8. The combine harvester of claim 1, wherein the grain tank level sensor array extends obliquely toward a center of the top end of the tank.

9. The combine harvester of claim 1, wherein the sensors of the grain tank level sensor array (i) are spaced apart from the side wall of the grain tank by a non-uniform distance, and (ii) are each mounted to the side wall by a spacer having a rounded top surface that limits crop from accumulating on the rounded surface of the spacer.

10. A combine harvester comprising:
a grain tank for storing separated grain, the grain tank having a bottom end, a top end, and a side wall extending between the bottom and top ends, and
a grain tank level sensor array for detecting a level of grain in the grain tank, the grain tank level sensor array comprising a plurality of sensors, wherein the grain tank level sensor array extends between the bottom end and the top end of the grain tank,
wherein the sensors are mounted to the side wall and are spaced apart between the bottom end and the top end, wherein a spacing between adjacent sensors of the plurality of sensors mounted to the side wall decreases in a direction towards the top end of the grain tank,
wherein the sensors of the grain tank level sensor array (i) are spaced apart from the side wall of the grain tank by a uniform distance, and (ii) are each mounted to the side wall by a spacer having a rounded top surface that limits crop from accumulating on the rounded surface of the spacer.

11. The combine harvester of claim 10, wherein each spacer is a fastener, screw, rod or standoff.

12. The combine harvester of claim 10, wherein for each spacer, the spacer is mounted directly to the side wall and the respective sensor is mounted directly to the spacer.

* * * * *